US008732129B2

(12) United States Patent
Kawakami et al.

(10) Patent No.: US 8,732,129 B2
(45) Date of Patent: *May 20, 2014

(54) STORAGE SYSTEM FOR MANAGING A LOG OF ACCESS

(75) Inventors: Norihiko Kawakami, Kawasaki (JP); Tetsuya Shirogane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,436

(22) Filed: May 31, 2012

(65) Prior Publication Data

US 2012/0239879 A1    Sep. 20, 2012

Related U.S. Application Data

(63) Continuation of application No. 12/348,406, filed on Jan. 5, 2009, now Pat. No. 8,214,333, which is a continuation-in-part of application No. 11/303,981, filed on Dec. 19, 2005, now abandoned.

(30) Foreign Application Priority Data

Oct. 18, 2005    (JP) ................................ 2005-302766

(51) Int. Cl.
*G06F 7/00* (2006.01)
(52) U.S. Cl.
USPC ....................................................... 707/648
(58) Field of Classification Search
USPC ................ 707/648, 636, 672, 999.204
See application file for complete search history.

(56) References Cited

U.S. PATENT DOCUMENTS

| 5,696,967 | A | 12/1997 | Hayashi et al. |
| 5,720,028 | A * | 2/1998 | Matsumoto et al. .......... 714/5.11 |
| 5,999,978 | A | 12/1999 | Angal et al. |
| 6,073,209 | A * | 6/2000 | Bergsten ........................ 711/114 |
| 6,282,610 | B1 * | 8/2001 | Bergsten ........................ 711/114 |
| 6,314,503 | B1 | 11/2001 | D'Errico et al. |
| 6,484,245 | B1 | 11/2002 | Sanada et al. |
| 6,493,825 | B1 | 12/2002 | Blumenau et al. |
| 6,728,879 | B1 | 4/2004 | Atkinson |
| 7,089,445 | B2 | 8/2006 | Kaiya et al. |
| 7,096,336 | B2 | 8/2006 | Furuhashi et al. |
| 7,117,320 | B2 * | 10/2006 | Ashmore et al. ............... 711/156 |
| 7,159,024 | B2 * | 1/2007 | Mitsuoka et al. .............. 709/225 |
| 7,206,832 | B2 | 4/2007 | Matsunami et al. |
| 7,266,538 | B1 * | 9/2007 | Shatil ..................................... 1/1 |

(Continued)

FOREIGN PATENT DOCUMENTS

| EP | 0952698 | 10/1999 |
| JP | 11-338840 | 12/1999 |

(Continued)

*Primary Examiner* — Mohammed R Uddin
(74) *Attorney, Agent, or Firm* — Brundidge & Stanger, P.C.

(57) ABSTRACT

Provided is a storage system including: a first interface connected to a host computer; a second interface connected to a manager terminal; a control unit connected to the first interface and the second interface and equipping a processor and a memory; and one or more disk drives in which data that is requested to read by the host computer is stored, in which the control unit detects an access from the host computer to the first interface and an access from the manager terminal to the second interface, and generates log data of operations according to the accesses. Accordingly, log data concerning every action and every operation of the storage system is maintained and stored.

18 Claims, 16 Drawing Sheets

(56) References Cited

U.S. PATENT DOCUMENTS

| | | |
|---|---|---|
| 7,380,094 B2 | 5/2008 | Igarashi et al. |
| 7,653,633 B2 | 1/2010 | Villella et al. |
| 2001/0020254 A1* | 9/2001 | Blumenau et al. ............ 709/229 |
| 2002/0065920 A1* | 5/2002 | Siegel et al. ................. 709/227 |
| 2002/0095547 A1 | 7/2002 | Watanabe et al. |
| 2002/0103804 A1 | 8/2002 | Rothschild et al. |
| 2002/0138762 A1 | 9/2002 | Horne |
| 2003/0115322 A1* | 6/2003 | Moriconi et al. ............ 709/224 |
| 2004/0054648 A1 | 3/2004 | Mogi et al. |
| 2004/0111485 A1 | 6/2004 | Mimatsu et al. |
| 2004/0139124 A1 | 7/2004 | Kawamura et al. |
| 2005/0114608 A1 | 5/2005 | Oshima et al. |
| 2005/0188318 A1* | 8/2005 | Tamir et al. .................. 715/744 |
| 2005/0198300 A1 | 9/2005 | Gong et al. |
| 2005/0210315 A1* | 9/2005 | Oda .................................. 714/5 |
| 2006/0218444 A1* | 9/2006 | Yoshida et al. ................. 714/20 |
| 2006/0236053 A1 | 10/2006 | Shiga et al. |
| 2007/0050417 A1 | 3/2007 | Hasegawa et al. |
| 2007/0067565 A1 | 3/2007 | Taninaka et al. |
| 2007/0088737 A1 | 4/2007 | Kawakami et al. |
| 2007/0208983 A1* | 9/2007 | Sudhakar et al. ............. 714/732 |
| 2009/0070412 A1* | 3/2009 | D'Angelo et al. ............ 709/203 |
| 2009/0125547 A1 | 5/2009 | Kawakami et al. |
| 2009/0204753 A1* | 8/2009 | Bridge et al. .................. 711/106 |
| 2009/0265233 A1* | 10/2009 | Sendo et al. ..................... 705/14 |
| 2010/0049608 A1* | 2/2010 | Grossman .................. 705/14.55 |
| 2010/0250735 A1* | 9/2010 | Andersen ...................... 709/224 |
| 2010/0332513 A1* | 12/2010 | Azar et al. ..................... 707/769 |
| 2011/0154223 A1* | 6/2011 | Whitnah et al. ............... 715/753 |
| 2011/0238754 A1* | 9/2011 | Dasilva et al. ................ 709/204 |
| 2011/0276396 A1* | 11/2011 | Rathod ...................... 705/14.49 |

FOREIGN PATENT DOCUMENTS

| | | |
|---|---|---|
| JP | 2002-116944 | 4/2002 |
| JP | 2002111667 | 4/2002 |
| JP | 2002-324000 | 11/2002 |
| JP | 2005-157711 | 6/2005 |

* cited by examiner

UNIFORM LOG FORMAT TEMPLATE 1500

| ITEM ORDER | ITEM NAME |
|---|---|
| 1 | TIME INFORMATION |
| 2 | PROCESS INFORMATION |
| 3 | TIME INFORMATION (DATE) |
| 4 | OPERATION |
| 5 | EVENT DESCRIPTION |
| 6 | EVENT RESULT |
| 7 | OPERATION TARGET DEVICE |
| 8 | IDENTIFIER OF OPERATION TARGET DEVICE |
| 9 | ACCESS SOURCE INFORMATION |

*FIG.7*

UNIFORM FORMAT FOR LOG OUTPUT

```
                                                              800
 Jun   20 10:20:30 LogProcess 20050620 - 10:20:30+9:00,userA,
 Authentication,Failed, Storage - system,12345678,from 192.168.0.5

Jun 20 12:34:56 LogProcess  20050620- 12:34:56+9:00, host1,
 Host  Login,Success, Storage- system,12345678,from 1001100101

Jun 20 13:44:55 LogProcess 20050620 -12:34 + 9:00,userB,
 Making RAID Group1,Success, Storage-system,12345678,from 192.168.0.2
```

FIG.8

LU ACCESS MANAGEMENT TABLE ~1600

| MANAGEMENT TARGET | LU ACCESS FLAG | | | | | |
|---|---|---|---|---|---|---|
| | CONTROLLER PROGRAM | | MANAGER TERMINAL | | HOST | |
| | Write | Read | Write | Read | Write | Read |
| LU1 | 1 | 1 | 1 | 1 | 1 | 1 |
| LU2 | 1 | 1 | 1 | 1 | 0 | 1 |
| LOG LU | 1 | 1 | 0 | 1 | 0 | 0 |
| ... | ... | ... | ... | ... | ... | ... |

LOG STORAGE AREA REGISTRATION FORM

- LUN: 00
- SIZE: 2G
- RAID GROUP: 0
- MANAGEMENT EXPIRATION: 12/31/2010

[OK] [CANCEL]

INTER-STORAGE-SYSTEM MIGRATION MANAGEMENT TABLE —900

| MANAGEMENT ITEM | MIGRATION INFORMATION ||
|---|---|---|
| | MIGRATION DESTINATION DEVICE | MIGRATION SOURCE DEVICE |
| ADDRESS | 1001100102 | 1 001100101 |
| MANAGEMENT IP ADDRESS | 192.168.0.2 | 192.168.0.1 |
| DEVICE NUMBER | 12345678 | 34567890 |
| MIGRATION DATE | 20050530 | 20000531 |

*FIG.16*

STORAGE SYSTEM FOR MANAGING A LOG OF ACCESS

The present application is a continuation of application Ser. No. 12/348,406, filed Jan. 5, 2009, now U.S. Pat. No. 8,214,333; which is a continuation of application Ser. No. 11/303,981, filed Dec. 19, 2005, now abandoned, which claims priority from Japanese patent application P2005-302766 filed on Oct. 18, 2005, and which is incorporated by reference herein in its entirety.

BACKGROUND OF THE INVENTION

This invention relates to a storage system used for a computer system, and more particularly to a log management technique for a storage system.

Recent advances of network technology have been introducing computer systems connected to networks in various environments such as companies, schools, and homes. In companies and schools, a group of computers installed in an organization are connected to a network to allow information sharing among the computers, and each computer is connected to the Internet to transmit information. The trend dramatically increases an information amount processed in systems. To adapt to the increasing information amount in circulation, capacities of storage systems used by users are also increasing rapidly.

In the above-mentioned situation where widespread network systems have made it common to use the storage systems connected to networks, the improvement of security in a storage system becomes increasingly important.

In recent years, thefts and corruptions of information have occurred due to unauthorized intrusions into network systems, while even government and municipal offices or companies have suffered damage from unauthorized access to tamper with their Websites.

Such security issues involve a method of exploit security holes to attack an operating system or software via computer network. In addition, there is a fear that unauthorized access to a storage system may cause data stored in the storage system to be read, deleted, or altered in structure.

For example, JP 2002-111667 A discloses one of security countermeasures to such unauthorized access, in which a log is maintained in order to detect and monitor unauthorized operation. In addition, the maintained log is stored for later use as an inspection record upon occurrence of any problems or failures.

Further, the security evaluation standard ISO/IEC 17799 stipulates that log collection is recommended in order to facilitate the procedure for handling failures or security-related issues upon the occurrence thereof. Further, various laws and regulations are beginning to stipulate that a log be obtained from an information system, and the obtained log be stored for a long term. Furthermore, when an information system failure results in a serious accident or incident, it is necessary to use a log as an evidence for diagnosing the cause thereof.

By storing manipulation records and operation records of an information system, such a diagnosis is possible as to whether the cause of failure is attributed to a certain action of a device in the information system or a certain operation during unauthorized access. Therefore, the log is significant information in terms of running the information system.

Meanwhile, a storage system have adopted a method of keeping a record of access from hosts as an access log. When a storage usage of the access log reaches an upper limit, older records of the access log are overwritten by newer records thereof to be deleted in order.

SUMMARY OF THE INVENTION

In terms of unauthorized intrusion into a computer system as described above, a storage system connected to a network is increasingly endangered. However, there has been a problem in that, even if accidents or troubles occur in a storage system or an information system including the storage system, the reference to a log maintained in the storage system leads to neither diagnosis of the cause nor collection of evidences.

Even without such unauthorized access, there is another fear that the running of the storage system may stop due to occurrence of any failures, such as parts' life expiration and malfunction, in the storage system itself. In such a case, it is also difficult to diagnose the cause of failure.

In such circumstances, in order to handle the above-mentioned various situations, it is becoming more important to obtain a log recording details of operation and processing performed in the storage system.

This invention has been made in view of the above-mentioned problem, and it is therefore an object to provide a storage system in which a log concerning every action and every operation of the storage system is maintained and stored.

According to an exemplary embodiment of this invention, there is provided a storage system including: a first interface connected to host computers; a second interface connected to manager terminals; a control unit connected to the first interface and the second interface and including a processor and a memory; and one or more disk drives in which data that is requested to read by the host computers is equipped, in which the control unit detects an access from the host computer to the first interface and an access from the manager terminal to the second interface, and generates a log of operations according to the accesses.

According to an embodiment of this invention, it is possible to record every processing requested through various interfaces provided to a storage system and each processing performed within the storage system on a log in a uniform format.

BRIEF DESCRIPTION OF THE DRAWINGS

The present invention can be appreciated by the description which follows in conjunction with the following figures, wherein:

FIG. 7 is an explanatory diagram of a uniform log format template according to the first embodiment;

FIG. 8 is an explanatory diagram of an example of a log generated according to the first embodiment;

FIG. 16 is an explanatory diagram of an inter-storage-system migration management table according to the first embodiment;

DETAILED DESCRIPTION OF THE PREFERRED EMBODIMENTS

According to a representative embodiment of this invention, every operation to a storage system received through every kind of interface that can be connected to the storage system is automatically recorded by the storage system itself as a log.

The storage system is provided with various interfaces using Fibre Channel (FC), Small Computer Systems Interface over Internet (iSCSI), Network Attached Storage (NAS), management Local Area Network (LAN), etc., and generates a log upon detection of access from a host computer 600 and a manager terminal 400 to the various interfaces. The generated log includes information on which computer is using the storage system. Block access to the storage system is also recorded on the log according to a template unique to the storage system. In addition, details of action performed within the storage system are recorded on the log according to the same template.

The storage system thus maintains the log, making it possible to reference to records of operation of the storage system as needed, and upon occurrence of a failure, making it possible to track down a cause thereof. In addition, it is possible to reference to an working condition of the storage system, which brings efficiency to the operation and management of the storage system.

Further, log data can be updated only from a permitted access source, which imposes limitations on who can maintain the log. Permission is given to a program running on the storage system as the permitted access source, thereby preventing writing, modifying, and deletion of the log due to the operation from an outside of the storage system.

Hereinafter, embodiments of this invention will be described in detail with reference to the drawings.
(First Embodiment)

Figure 1:
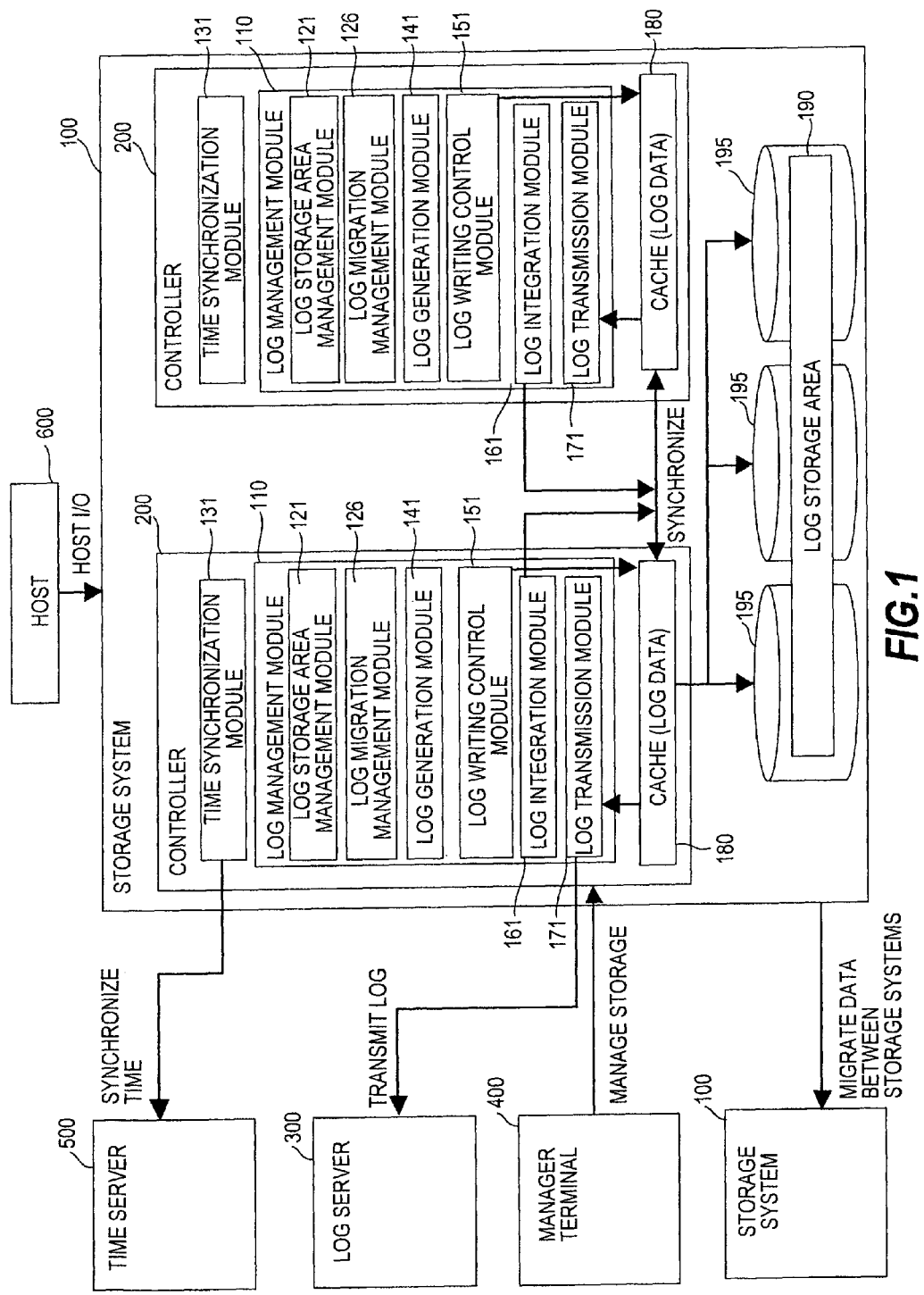
FIG. 1 is a functional block diagram showing a system structure of a storage system according to a first embodiment.

FIG. 1 is a functional block diagram showing a system structure of a storage system 100 according to a first embodiment.

The storage system 100 equips a controller 200 and a disk drive 195.

The controller 200 equips a log management module 110 and a time synchronization module 131. The log management module 110 includes a log storage area management module 121, a log migration management module 126, a log generation module 141, a log writing control module 151, a log integration module 161, and a log transmission module 171. As described later, the controller 200 equips an MPU 220 and a memory 250, in which the MPU 220 executes various programs stored in the memory 250 to implement the above-mentioned modules.

When the controller 200 receives a host I/O request from a host 600 and a request of management operation from a manager terminal 400, the controller 200 performs processings corresponding to those requests. The log management module 110 generates log data relating to details of requested operations and processings corresponding to the requests, and store the log data in the disk drive 195.

The log generation module 141 is implemented by executing the log generation program 140, and generates log data relating to the operation to the storage system 100 and the details of processings according to the operation. The log writing control module 151 is implemented by executing a log writing control program 150, and writes the generated log data to a cache 180.

It should be noted that in the case where a plurality of controllers 200 are in operation, one of those controllers is set as a main controller for mainly managing log. The log management module 110 of the main controller outputs log that incorporates the processing details of another controller.

In other words, the log integration module 161 of the main controller synchronizes log data stored in caches 180 of the respective controllers, and stores all the log data in the cache 180 of the main controller.

Then, the log transmission module 171 of the main controller transmits the log data stored in the cache 180 to a log server 300 connected to the storage system 100.

The log integration module 161 is implemented by executing a log integration program 160. The log transmission module 171 is implemented by executing a log transmission program 170.

Further, the controller 200 writes the log data stored in the cache 180 to a log storage area 190 set in the disk drive 195 periodically (for example, at a predetermined time interval). Accordingly, the log storage area management module 121 is implemented by executing a log storage area management program 120, a log storage area for storing log data is reserved in the disk drive 195 in advance.

Figures 14, 15:
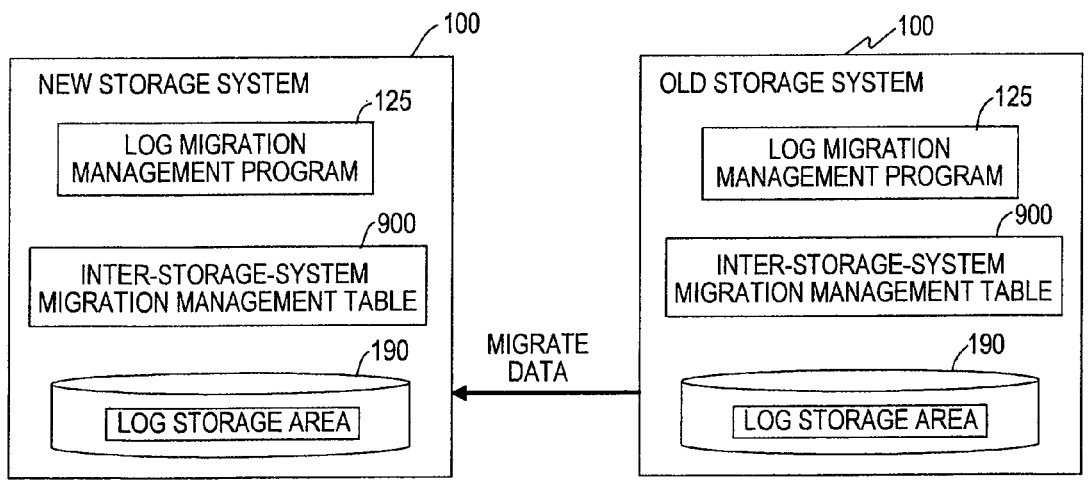
FIG. 14 is an explanatory diagram of a log storage area registration screen according to the first embodiment.
FIG. 15 is an explanatory diagram of a data migration processing performed between storage systems according to the first embodiment.

The log migration management module 126 is implemented by executing a log migration management program 125, and migrates log data to/from another storage system 100. FIG. 15 will be used later to describe a log data migration processing.

The time synchronization module 131 is implemented by executing a time synchronization program 130, and in order to share the same time among the computer system, communicates with a time server 500 to synchronize an internal clock. Accurate synchronization of the internal clock allows the log data to include accurate time information therein.

Figure 2:
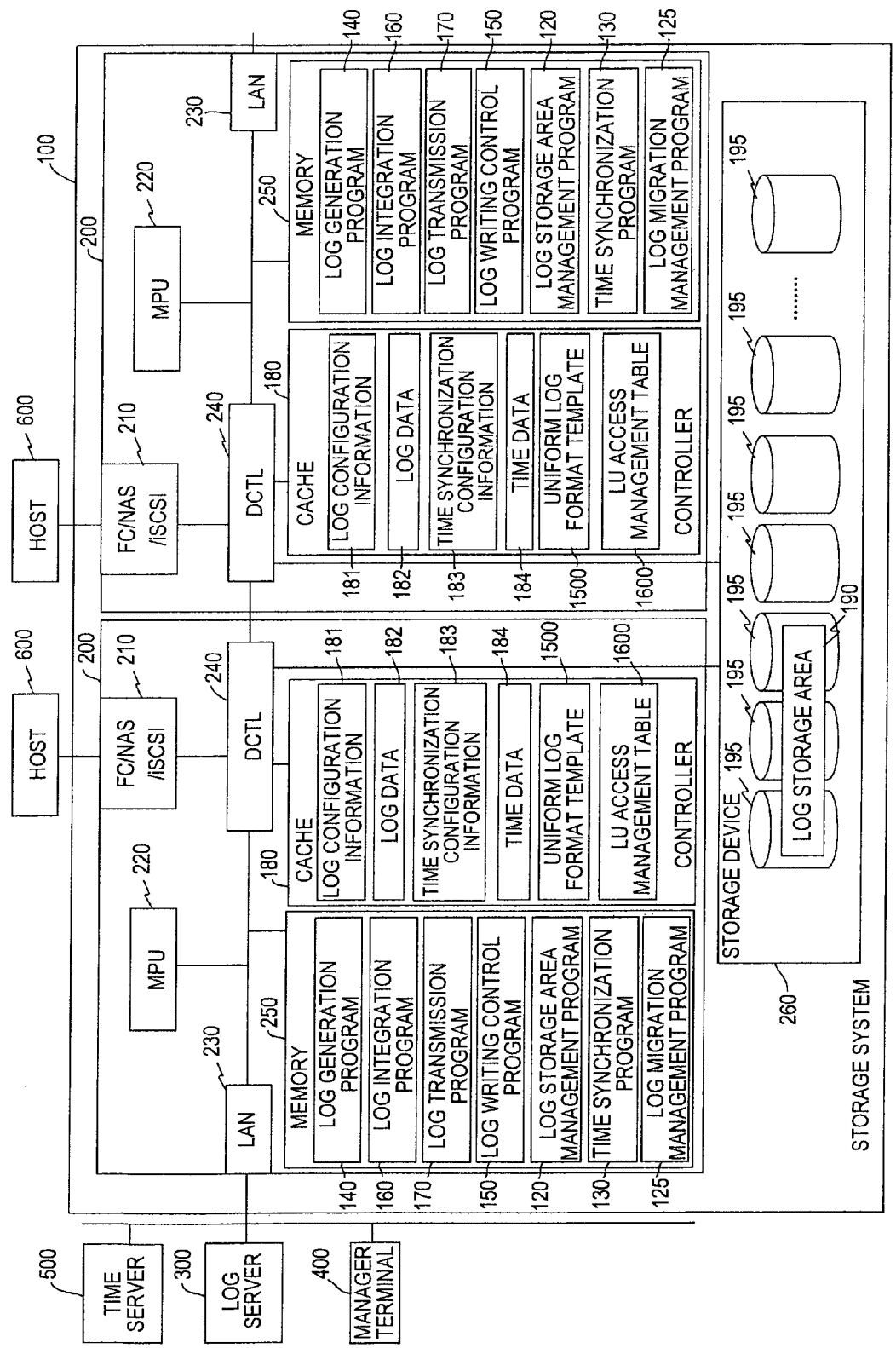
FIG. 2 is a block diagram showing a hardware structure of the storage system according to the first embodiment.

FIG. 2 is a block diagram showing a hardware structure of the storage system 100 according to the first embodiment.

The storage system 100 is connected to the log server 300, the manager terminal 400, the time server 500, and the host 600 through a network. It should be noted that part or all of those may be directly connected to the storage system 100.

The storage system 100 equips the plurality of controllers 200 and a storage device 260. It should be noted that the two controllers 200 are shown in the drawing, but the number of controllers 200 is not limited thereto.

The controller 200 equips a host interface 210, a LAN interface 230, the MPU 220, a Data Controller (DCTL) 240, the memory 250, and the cache 180.

The host interface 210 controls communications with the host 600 via protocols suitable for data transfer such as Fibre Channel (FC), Network Attached Storage (NAS), and Internet SCSI (iSCSI). The LAN interface 230 uses protocols including TCP/IP to control management-based communications with the time server 500, the log server 300, and the manager terminal 400.

The DCTL 240 controls data transfer within the storage system 100.

The memory 250 stores the various programs and data necessary for executing the programs. To be specific, the memory 250 stores the log storage area management program 120, the log migration management program 125, the time synchronization program 130, the log generation program 140, the log writing control program 150, the log integration program 160, and the log transmission program 170. Those programs are stored in the storage device 260, transferred to the memory 250 upon start of the storage system 100, and then executed by the MPU 220.

The cache 180 stores various information items to be used by the log management module 110. To be specific, the cache 180 stores log configuration information 181, log data 182, time synchronization configuration information 183, and time data 184. It should be noted that in the first embodiment, the various information items are stored in the cache, but as described later in a second embodiment, part or all of the various information items may be stored in a storage medium other than the cache.

The log configuration information 181 is configured with regard to collection of log, including a stored location of the log storage area, a size of the log storage area, a term over which the log storage area is managed, and an address of a log server at a log transmission destination. The log data 182 is obtained by temporarily storing a log generated by the log generation program 140.

The time synchronization configuration information 183 is configured with regard to the synchronization of the internal clock, including a timing of the time synchronization and an address of the time server 500. The time data 184 is obtained by the time synchronization program 130 through the communications with the time server 500.

The storage device 260 equips one or more disk drives 195. The disk drives 195 are each a storage medium for storing data. In general, a magnetic disk is used as the storage medium, but other media including an optical disk may be used. The storage device 260 is provided with one or more logical areas in which data to be used by the host computer 600 is stored. The storage device 260 is also provided with the log storage area in which the generated log data is stored.

It should be noted that the disk drives 195 constitute a Redundant Array of Independent Disks (RAID) configuration to provide redundancy of the data to be stored. This prevents the stored data from being lost even when a failure occurs in part of the disk drives 195.

It should be noted that, although not shown, the time server 500, the log server 300, the manager terminal 400, and the host 600 are computers each including a processor, a memory, an interface, a storage device, an input device, and a display device that are connected to one another via an internal bus.

Figure 3:
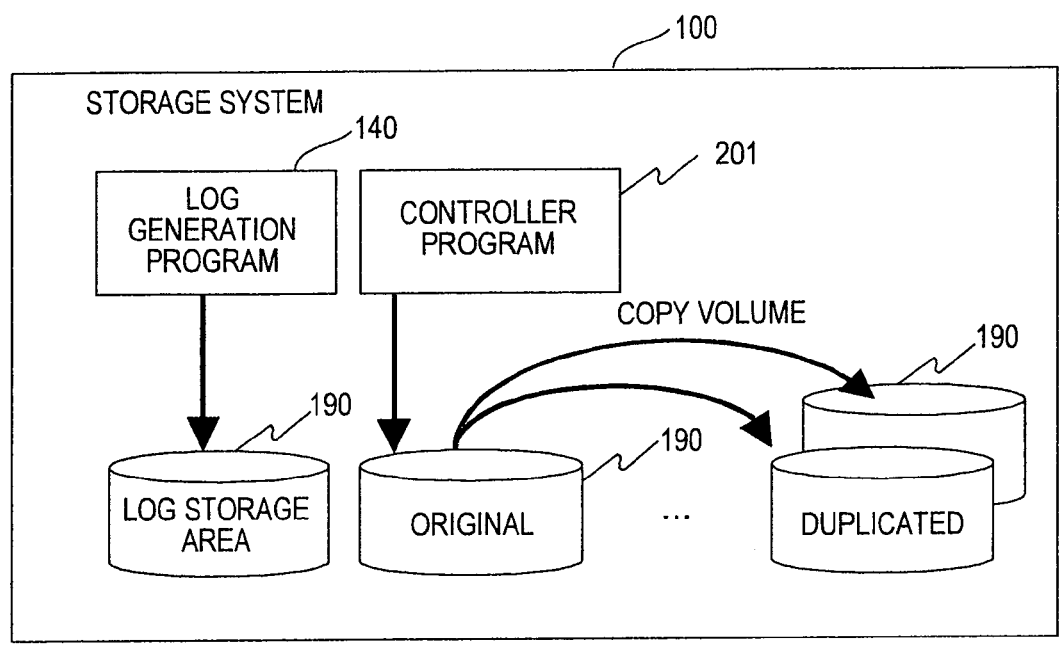
FIG. 3 is an explanatory diagram of a log generation processing of the storage system according to the first embodiment.

FIG. 3 is an explanatory diagram of a log generation processing of the storage system 100 according to the first embodiment.

A controller program 201 executes an internal processing of the storage system 100. FIG. 3 shows copy processing from a original disk volume to a duplicated disk volume. The controller program 201 operates under control of the DCTL 240. It should be noted that the DCTL 240 may be configured not by a processor, but by a hardware logic that operates in the same manner as the controller program 201.

When the controller program 201 executes a requested process, the controller program 201 notifies the log management module 110 of the processing details and processing results. When the log generation program 140 receives the notification from the controller program 201, the log generation program 140 generates log including information about what process performed and what results are obtained, and stores the log in the log storage area 190.

FIG. 3 shows an example case of generating log relating to the internal operation of the storage system 100. However, processings in response to the host I/O request from a host 600 and the management operation request from a manager terminal 400 are similarly recorded in log based on the notification from the controller program 201.

Figure 4:
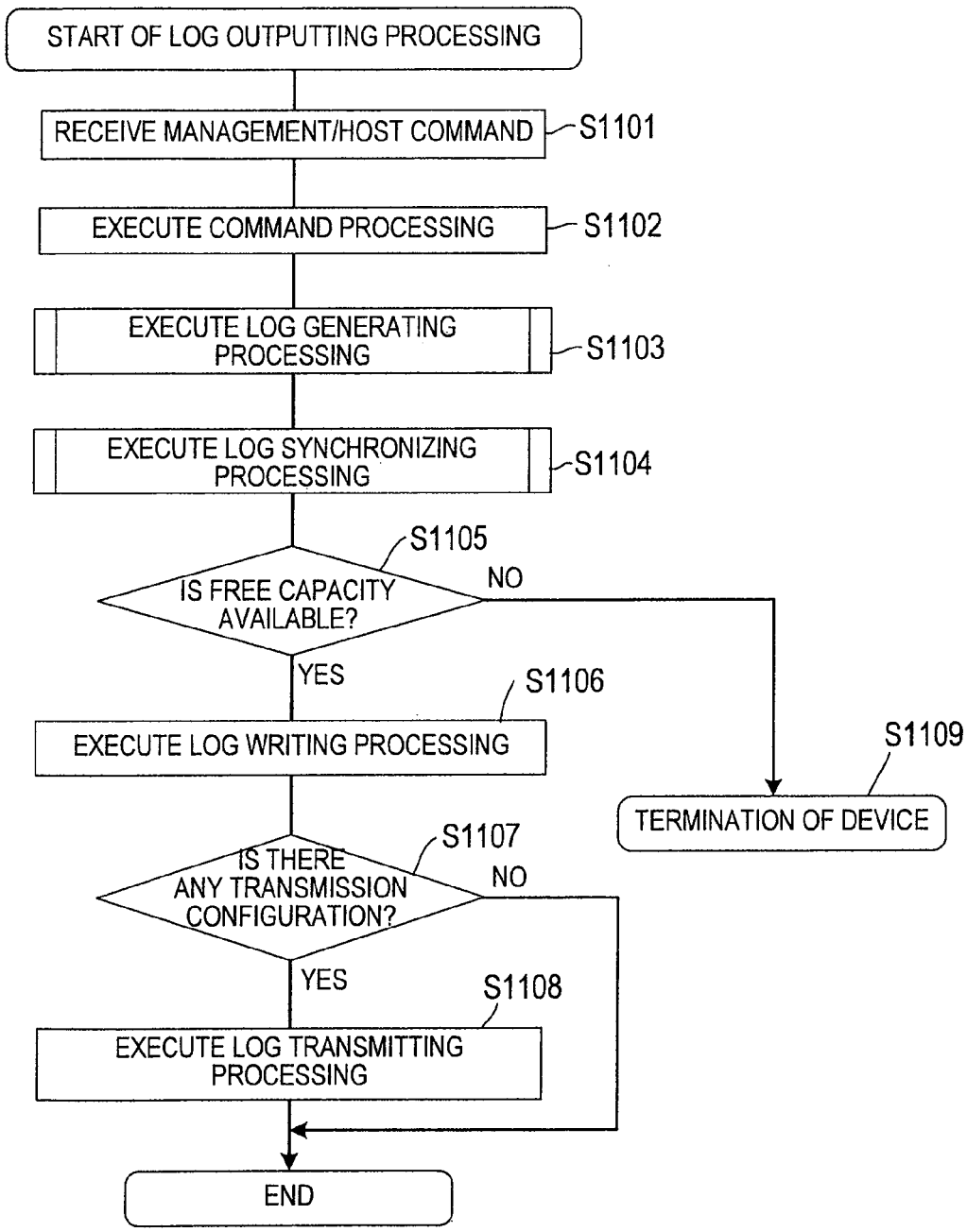
FIG. 4 is a flowchart showing a log output processing according to the first embodiment.

FIG. 4 is a flowchart showing log output processing according to the first embodiment.

In the log output processing, upon reception of a host command or a management command, the storage system 100 outputs the processing details and processing results involved in the command to the log storage area 190. Then, the storage system 100 transmits the stored log to the log server 300.

First, the controller 200 receives an I/O command from the host 600 through the host interface 210. Alternatively, the controller 200 receives a management command from the manager terminal 400 through the LAN interface 230 (S1101).

After that, the controller 200 performs a processing corresponding to the command received in the step S1101 (S1102).

After that, the log generation program 140 generates log data based on the executed processing details (S1103). It should be noted that FIG. 5 will be used to describe the log generation processing in detail.

After that, the main controller 200 synchronizes their each log data (S1104). It should be noted that FIG. 9 will be used to describe a log integration processing.

After that, the log writing control program 150 judges whether or not the log storage area 190 has enough free capacity to allow a log to be written (S1105). When it is judged that the free capacity is too small to write the log, the storage system 100 is stopped (S1109) to end the log output processing.

On the other hand, when the log storage area has sufficient capacity, the log data generated in the step S1105 is written to the log storage area 190 (S1106).

Next, the log transmission program 170 refers to the log configuration information 181 stored in the cache 180 to judge whether an address of the log server 300 to which the log is to be transmitted is configured or not (S1107).

When the result indicates that the address of the log server 300 is already configured which implies that configuration have been made for log transmission to the external log server 300, the generated log is transmitted to the log server 300 (S1108). After that, the log output processing finishes.

On the other hand, when the address of the log server 300 is not configured, which implies that no configuration have been made for the log transmission to the external log server 300, the log output processing comes to an end.

Figure 5:
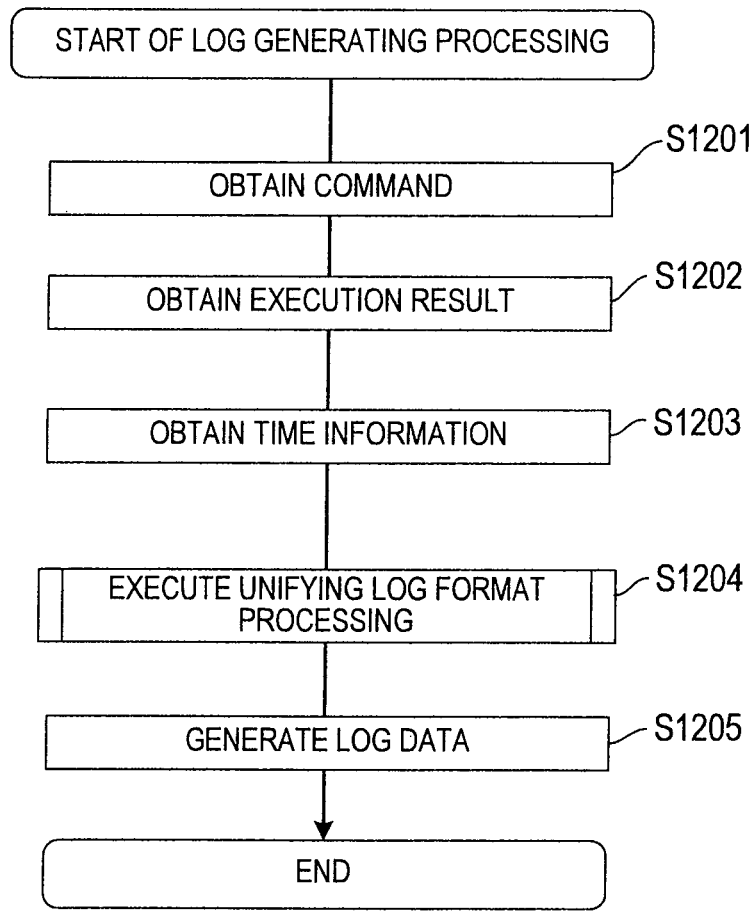
FIG. 5 is a flowchart showing a log generation processing according to the first embodiment.

FIG. 5 is a flowchart showing the log generation processing (S1103 of FIG. 4) according to the first embodiment, which is executed by the log generation program 140.

First, the log generation program 140 obtains a command to be executed by the controller 200 (S1201), and then obtains execution results of the command (S1202).

To be specific, upon execution of a process involved in the command, the controller program 201 notifies the log generation program 140 of the processing details and processing results involved in the command.

Next, the log generation program obtain the time data 184 stored in the cache 180 (S1203).

After that, collected information items are adjusted to a uniform format (hereinafter, referred to as "formatted") for outputting to log (S1204). It should be noted that FIG. 6 will be used later to describe a log format processing.

Finally, the formatted log data is stored in the cache 180 (S1205), which ends the log generation processing.

Figure 6:
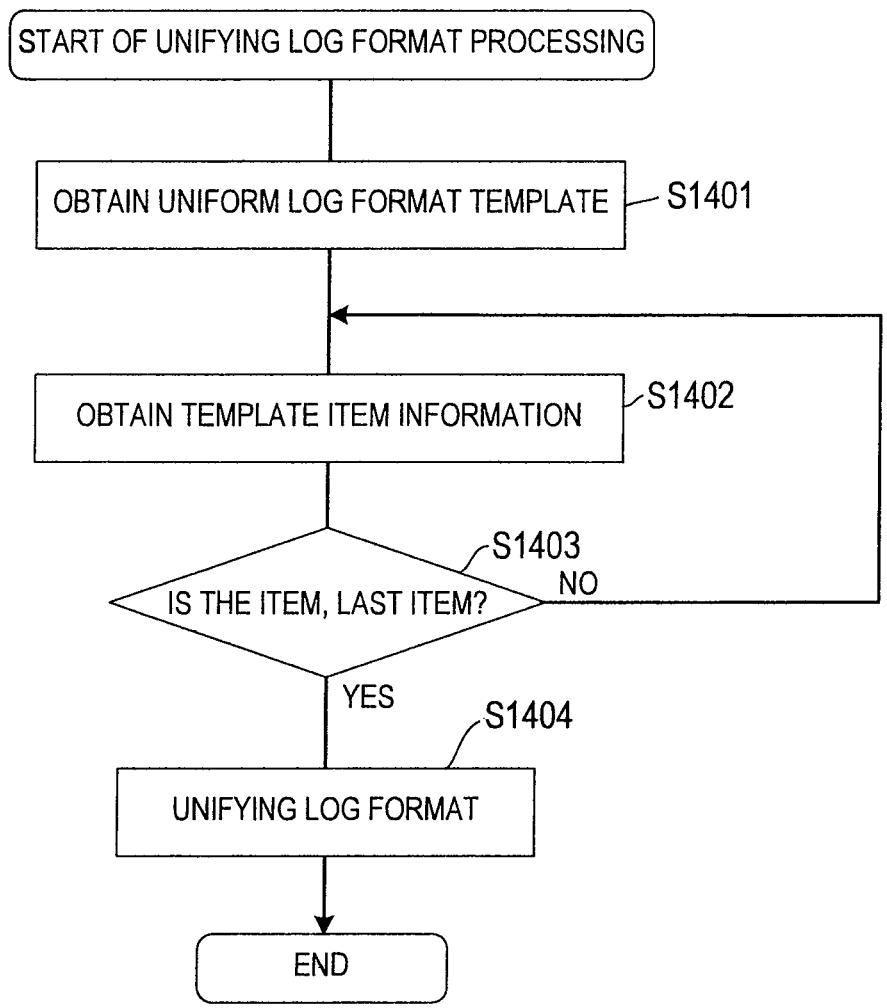
FIG. 6 is a flowchart showing a log format unification processing according to the first embodiment.

FIG. 6 is a flowchart showing the log format processing (S1204 of FIG. 5) according to the first embodiment, which is executed by the log generation program 140.

First, a uniform log format template 1500 stored in the cache 180 is obtained (S1401).

Then, information items corresponding to fields defined in the uniform log format template 1500 are obtained from the collected information items (S1402).

Then, it is judged whether or not the corresponding information items up to the last fields defined in the uniform log format template 1500 have been obtained (S1403). When the results indicates that the information items up to the last field defined in the uniform log format template 1500 have not been obtained yet, the procedure returns to the step S1402 to obtain an information item corresponding to the subsequent field. On the other hand, when all the information items up to the last field have been obtained, the procedure advances to a step S1404. In the step S1404, fields within the uniform log format template 1500 are correspondingly filled with the obtained information items to generate formatted log data (S1404).

FIG. 7 is an explanatory diagram of the uniform log format template 1500 according to the first embodiment.

The uniform log format template 1500 is used for generating formatted log relating to processings corresponding to requests received through various interfaces, and includes an item order 1501 and an item name 1502. The uniform log format template 1500 is stored in the cache 180.

The item order 1501 defines an output order of the information items as log data. The item name 1502 defines information details to be outputted as log data.

According to the uniform log format template 1500, log as shown in FIG. 8 is generated.

Log data 800 shown in FIG. 8 includes an occurrence date of an event, a detecting program, a operator, a description of an operation, an event result, a operation target device, an identifier of a operation target device, and access source information. The log data 800 is recorded in a format conforming to the syslog format, and outputted from the log management module 110.

For example, in a first entry shown in FIG. 1, the description "Jun 20 10:20:30" indicates the occurrence date of an event. The description "LogProcess" indicates the program that has detected the event. The description "200506 10:20:30+9:00" is another occurrence date of the event, which is accompanied by time zone information. The description "userA" indicates a operator who has performed the operation. The description "Authentication" corresponds to the event description, indicating that an authentication request has been received. The description "Failed" corresponds to the event result, indicating that the authentication has resulted in a failure. The description "Storage-system" indicates the operation target device. The description "12345678" indicates the identifier unique to the operation target device. The description "from 192.168.0.5" indicates an IP address of an access source host that has accessed the storage system 100.

Items to be outputted to the log vary depending upon various factors including event details. For example, when there exists a operator to which a given event is ascribed, there are an internal operation executed autonomously by the storage system 100, an event caused by access from the host interface 210, an event caused by access through a management interface 230, and the like. Even when output information items are different depending upon those events, the use of a single template allows log to be outputted in a uniform format.

However, the log format does not need to be a specific format as long as necessary information is included. In other words, it is sufficient that the log relating to various events can be outputted in a uniform format by using a template that is uniform within the storage system 100. Further, the storage system 100 may provide the function to edit the template.

Figure 9:
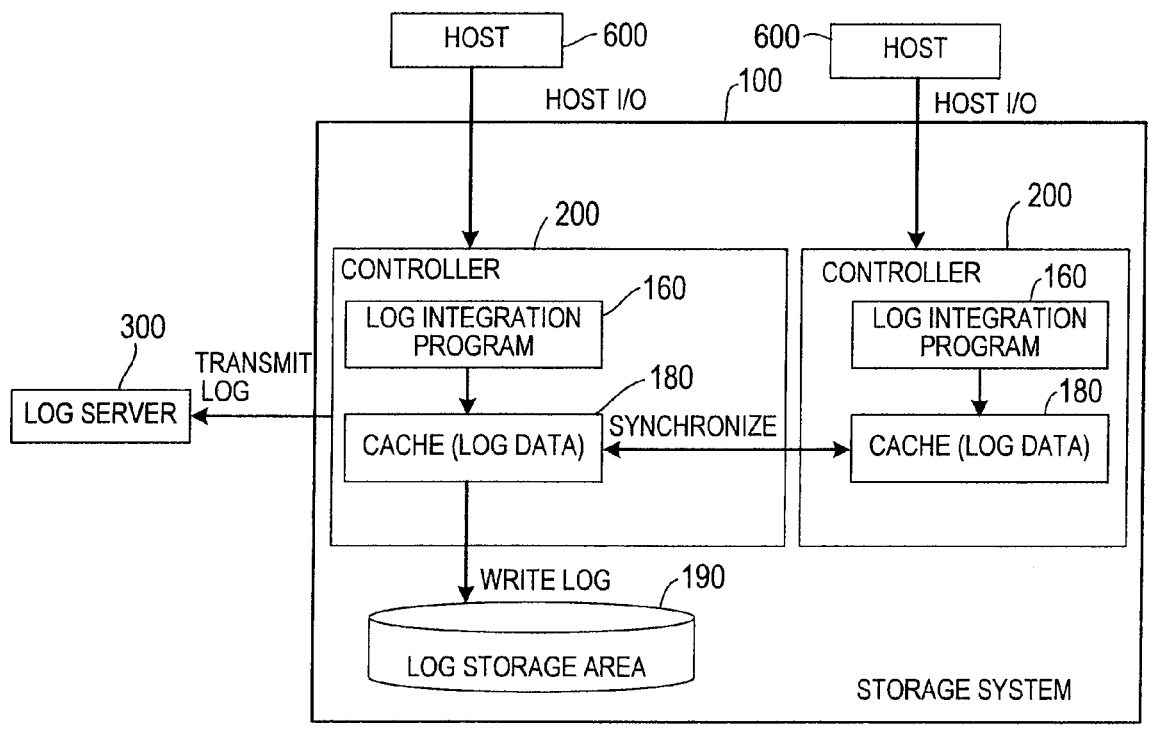
FIG. 9 is an explanatory diagram of an example of a log integration processing performed between a plurality of controllers according to the first embodiment.

FIG. 9 is an explanatory diagram of the log integration processing performed between the plurality of controllers 200 according to the first embodiment.

On a controller 200 basis, the storage system 100 accepts access from the host 600 through the host interface 210, and access from the manager terminal 400 through the management interface 230. Then, each of the controllers 200 executes a processing on the access.

The log generation module 141 of the controller 200 generates log relating to operation details requested of the controller 200 and action details of the storage system 100 involved in the request. Then, the log writing control module 151 writes generated log data to the cache 180.

Set in the storage system 100 including the plurality of controllers 200 are the main controller 200 in charge of main log management and a sub controller that follows the main controller 200.

The log integration program 160 of the main controller 200 reads out log data from the log storage area of the cache 180 of another controller 200, and writes the log data to the cache 180 of the main controller 200 itself. Then, the main controller 200 performs management by synchronizing all log data within the storage system 100.

It should be noted that in this embodiment, log data is synchronized between the controllers 200 (in other words, the same log data is stored in the caches 180 of the controllers 200), but logs may be integrated on the log server 300 without necessarily synchronizing log data between the controllers 200. Alternatively, only the cache 180 of the main controller 200 may store all the log data within the storage system 100.

After that, the log writing control program 150 records the synchronized log data in the log storage area 190 of the disk drive 195. Further, the log transmission program 170 reads out the log data stored in the cache 180 and transmits the log data to the log server 300.

Next, description will be made on a processing of setting the log storage area 190.

Figure 10:
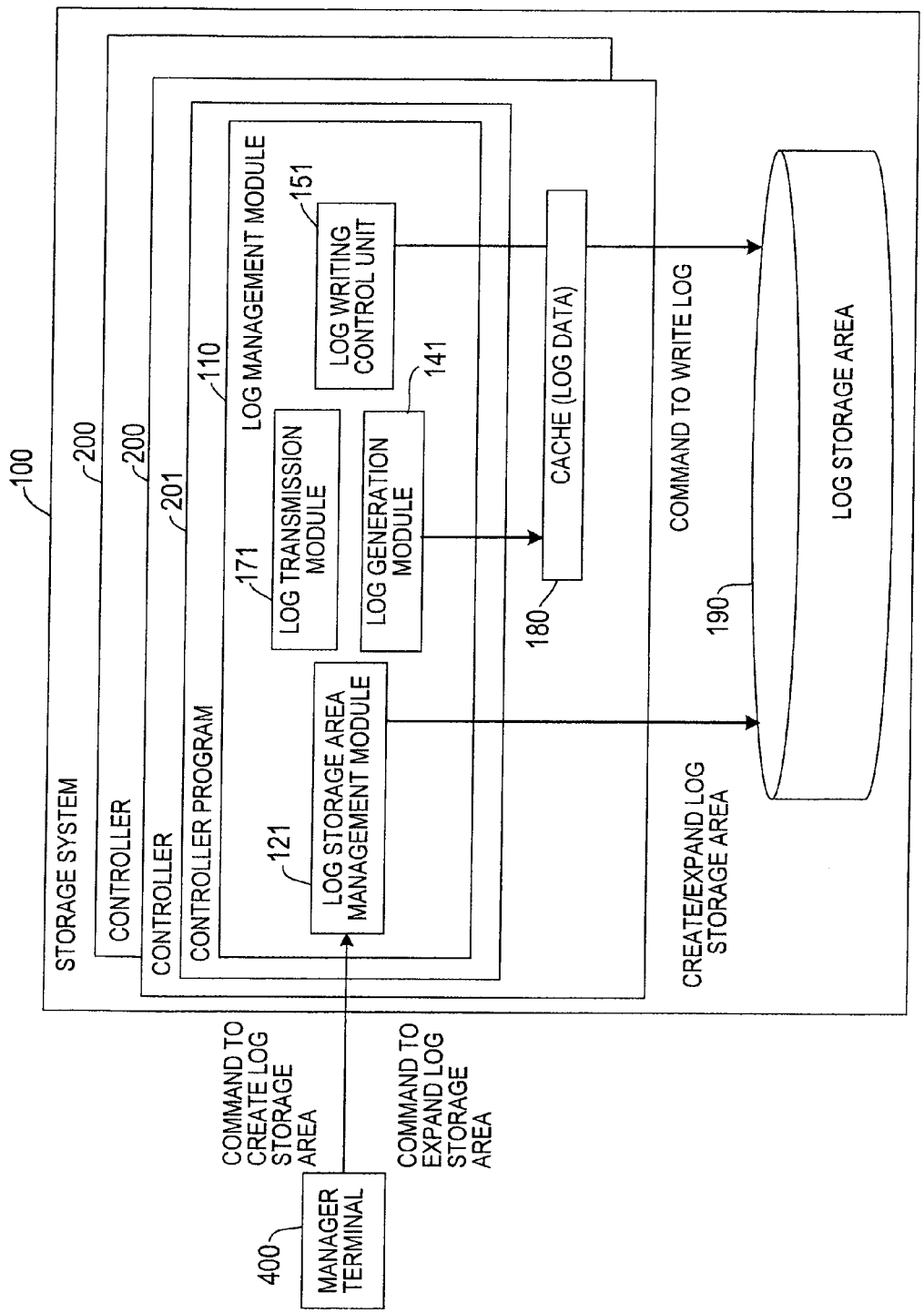
FIG. 10 is an explanatory diagram of a processing relating to configuration of a log storage area according to the first embodiment.

FIG. 10 is an explanatory diagram of a processing relating to setting of a log storage area 190 according to the first embodiment.

The log storage area 190 is set according to an instruction from the manager terminal 400.

A user of the storage system 100 first uses the manager terminal 400 to create the log storage area 190. To be specific, the user designates a location of the log storage area 190 in the disk drives 195 of the storage system 100, a capacity of the log storage area 190, and a log retention term. After that, the manager terminal 400 transmits a command to create a log storage area to the storage system 100.

The created log storage area 190 is an area that cannot be recognized and cannot be accessed from the host 600. However, the log storage area 190 can be operated by the manager terminal 400.

It should be noted that data can be written to the created log storage area 190 only from a program permitted in advance. The manager terminal 400 cannot perform data operation, such as changing or tampering, on the log storage area 190. In addition, the manager terminal 400 cannot delete the log storage area 190 itself. Thus, the storage system 100 of this embodiment includes an LU access management table 1600 shown in FIG. 12.

Accordingly, after the log storage area 190 is created, the log writing control module 151 writes the log data stored in the cache 180 to the log storage area 190.

On the other hand, in preparation for an insufficient capacity of the log storage area 190, the manager terminal 400 provides the function to perform area expansion operation of the log storage area 190. To be specific, the manager terminal 400 transmits to the storage system 100 a command to expand a log storage area according to the capacity specified by the user.

When a predetermined amount of the log storage area 190 is used up by storing logs, the manager terminal 400 may notify of the condition of insufficient capacity.

Figure 11:
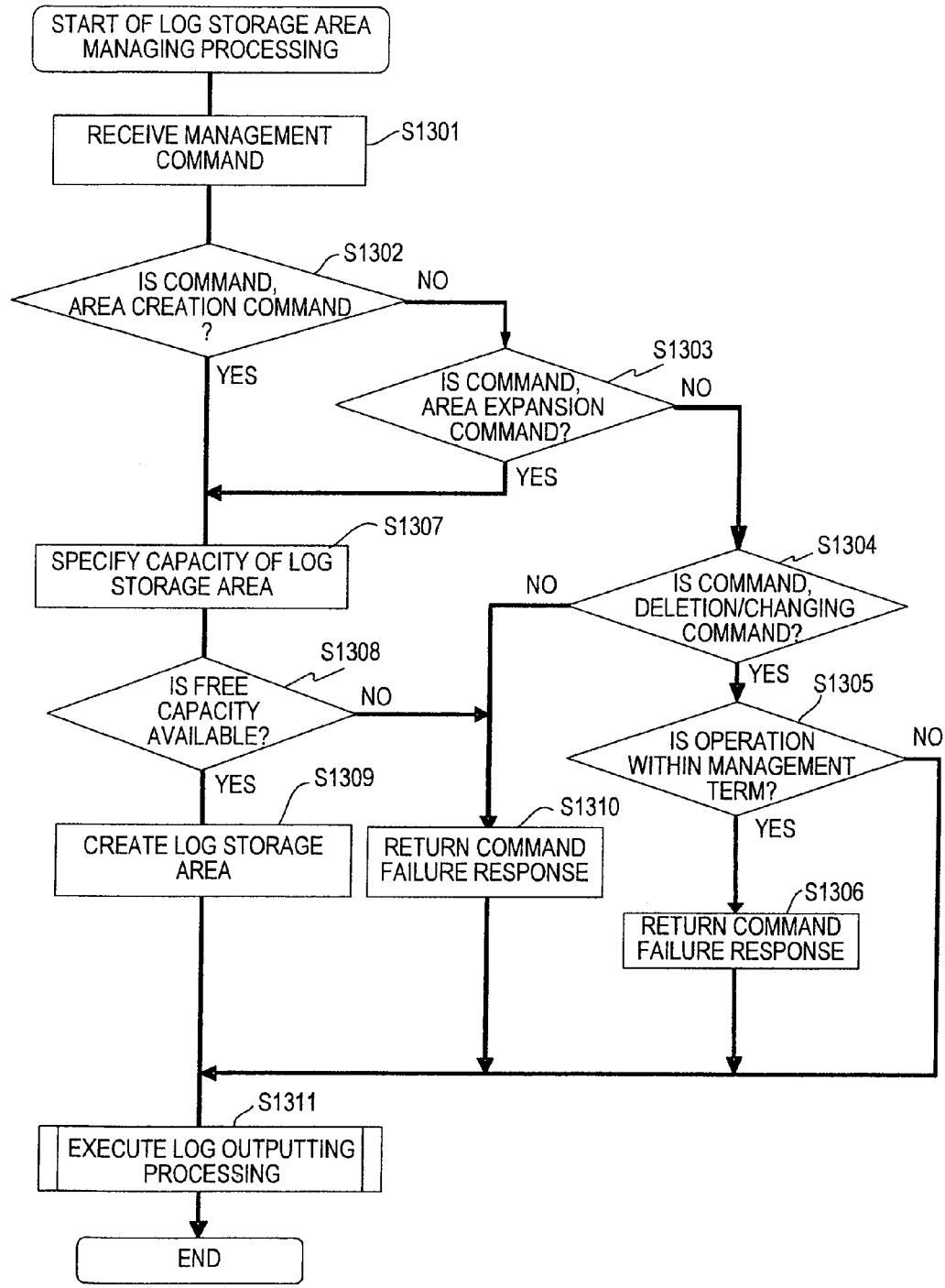
FIG. 11 is a flowchart of a management processing for log storage area according to the first embodiment.

FIG. 11 is a flowchart of a management processing for a log storage area according to the first embodiment, which is executed by a log storage area management program 120.

First, the controller 200 receives a management command from the manager terminal 400 through the LAN interface 230 (S1301).

Next, it is judged whether or not the received management command is an area creation command to create the log storage area 190 (S1302). When the received command is the area creation command, the procedure advances to a step S1307.

On the other hand, when the received command is not the area creation command, it is judged whether or not the command is an area expansion command to expand the log storage area 190 (S1303). When the received command is the area expansion command, the procedure advances to the step S1307.

On the other hand, when the received command is not the area expansion command, it is judged whether or not the received command is a deletion/changing command to delete/change the log storage area 190 (S1304). When the judgment result indicates that the received command is not the deletion/changing command, which implies that the command cannot be handled in the log storage area management processing, a command failure response is returned to the manager terminal 400 (S1310), and the procedure advances to a step S1311.

On the other hand, when the received command is the deletion/changing command, the controller 200 refers to the log configuration information 181 stored in the cache 180 to judge whether or not the target log storage area 190 is in operation within a management term (S1305). When the operation is within the management term, which implies that the log storage area 190 is protected from any changing processing, the command failure response is returned to the manager terminal 400 (S1306), and the procedure advances to the step S1311. When the operation is not within the management term, the processing of deleting or changing the log storage area 190 corresponding to the received command is executed, and the procedure advances to the step S1311.

On the other hand, when the received command is the area creation command or the area expansion command, in the step S1307, the controller 200 extracts the specified capacity of the log storage area 190 created in the area creation command or the area expansion command (S1307).

Then, it is judged whether or not the specified capacity is available in the disk drive 195 provided to the storage system 100 (S1308). When the specified capacity is available, the log storage area 190 is created to have the specified capacity (S1309).

On the other hand, when the specified capacity is not available, the command failure response is returned to the manager terminal 400 (S1310), and the procedure advances to the step S1311.

Finally, in the step S1311, to generate log relating to details of the processing executed according to the received management command, the processing details and processing results are outputted (S1311), and the log storage area management processing finishes.

Figures 12, 13:
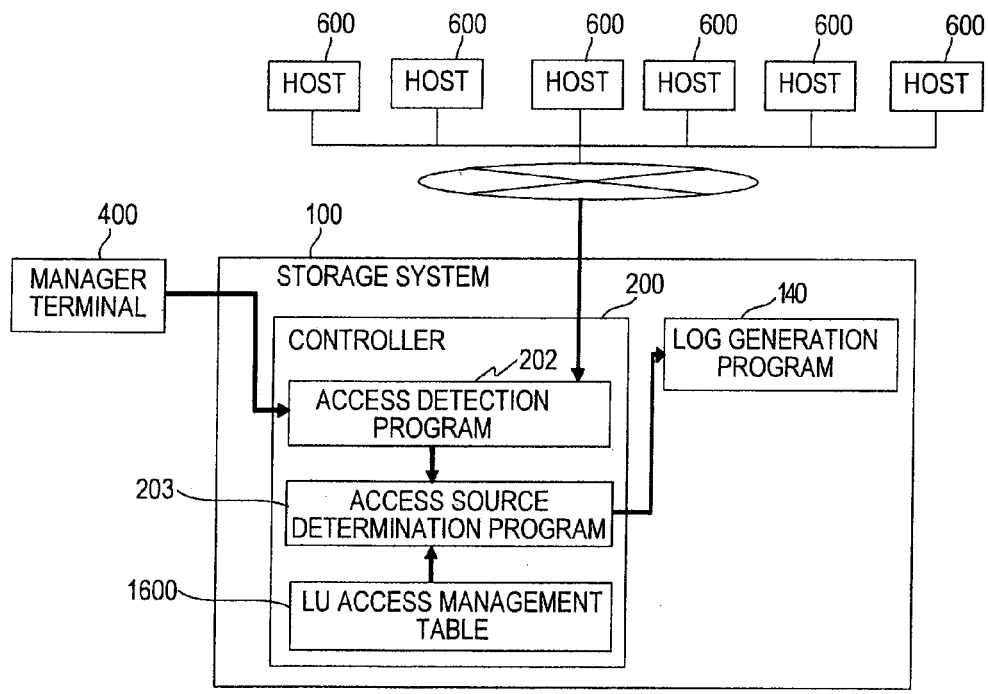
FIG. 12 is an explanatory diagram of an LU access management table according to the first embodiment.
FIG. 13 is an explanatory diagram of a processing of generating a log after recognizing access to the storage system according to the first embodiment.

FIG. 12 is an explanatory diagram of an LU access management table 1600 according to the first embodiment.

The LU access management table 1600 is stored in the cache 180, and used to manage rights to access the storage system 100 from the manager terminal 400 and the host 600.

The LU access management table 1600 includes a management target 1601 and an LU access flag 1602.

The management target 1601 defines data storage areas on a storage system. It should be noted that the log storage area is also defined as an independent log LU in the management target 1601.

The LU access flag 1602 defines subjects being access sources with respect to the management target. Flags indicating whether or not to allow the access source subjects to write and read data to/from each management target are set on a management target basis, thereby setting rights to access from the respective access sources. When the flag is set to "1", the operation corresponding to write, change, or read is permitted. On the other hand, when the flag is set to "0", the operation corresponding to write, change, or read is not permitted.

In the conditions shown in FIG. 12, a controller program can read/write data from/to the log LU, the manager terminal 400 can only read the log data, and the host computer 600 cannot read/write the log data. In other words, the log LU is set as an area that cannot be recognized by the host computer 600.

FIG. 13 is an explanatory diagram of a processing of generating log after recognizing various accesses to the storage system 100 according to the first embodiment.

According to the first embodiment, an access detection program 202 and an access source determination program 203 run on the controller 200 of the storage system 100.

When the storage system 100 is accessed from the host 600 through the host interface 210 or from the manager terminal 400 through the LAN interface 230, the access detection program 202 running on the controller 200 detects the access.

After that, the access source determination program 203 determines which the access is being made from, and refers to the LU access management table 1600 to judge whether or not to permit the access. When the access is permitted, the log generation program 140 is notified of the processing details and processing results based on the access. The log generation program 140 generates log based on the notification.

FIG. 14 is an explanatory diagram of a log storage area registration screen 1000 according to the first embodiment.

The screen shown in FIG. 14 is an example of a user interface for setting the log storage area 190 in the storage system 100, and is displayed on a display device of the manager terminal 400 used by a user.

The log storage area registration screen 1000 is provided with names of input items and input fields 1001 to 1004 to be filled with values corresponding thereto. To be specific, inputted in the log storage area registration screen 1000 are a logical unit number (LUN) 1001 of a logical unit in which a log storage area is to be created, a size 1002 of the log storage area, a RAID group number 1003 of a RAID group in which the log storage area is created, and a management expiration 1004 until which log is stored.

After filling the input fields with the values, a user of the storage system 100 presses an "OK" button 1005 with an input device (such as a mouse) to reflect the input settings on the storage system 100. Alternatively, the user presses a "cancel" button 1006 to discard the input information.

By specifying the LUN 1001, the size 1002, and the RAID group 1003, the user designates which size of area is reserved in which location in the disk drive 195. In addition, the log is maintained in the log storage area 190 until the date specified in the management expiration 1004. Further, the changing and deletion of the log storage area 190 is not permitted until the date specified in the management expiration 1004, thereby realizing protection of the log storage area 190.

It should be noted that the input items may be changed depending upon the conditions necessary to set in the storage system 100. Also, instead of a GUI, other input methods such as a command line interface may be adopted.

FIG. 15 is an explanatory diagram of the data migration processing performed between storage systems 100 according to the first embodiment.

To migrate data between the storage systems 100, the log migration management program 125 is executed to transfer user data stored in the disk drive 195 of the storage system 100 and log data stored in the log storage area 190, to the storage system 100 at a migration destination. At this time, information on the storage system 100 at a migration source and information on the storage system 100 at the migration destination are managed by using an inter-storage-system migration management table 900, thereby managing information on when data is migrated from which storage system 100 to which storage system 100. By recording information in the inter-storage-system migration management table 900, it is possible to provide means for managing log continuously.

Further, information on association between the storage systems 100 is recorded in a newly-provided storage system 100. Then, the recorded association information allows the newly-provided storage system 100 to use the log data stored in an old storage system 100. It should be noted that in this case, it is unnecessary to migrate the log data, but necessary to maintain the old storage system 100.

FIG. 16 is an explanatory diagram of the inter-storage-system migration management table 900 according to the first embodiment.

Upon the data migration between the plurality of storage systems 100, information as to from which storage system 100 to which storage system 100 the data is migrated is stored in the inter-storage-system migration management table 900.

The inter-storage-system migration management table 900 includes a management item 901 and migration information 902. To be specific, the inter-storage-system migration management table 900 includes an address 906, a management IP address 907, a device number 908, and a migration date 909 for each migration destination device 903 and each migration source device 904.

The address 906 indicates information on an address of a host interface. The management IP address 907 indicates information on an IP address of a management interface. The device number 908 indicates an identifier for uniquely identifying the storage system 100. The migration date 909 indicates a date on which data is migrated.

As described above, according to the first embodiment of this invention, log data is generated according to the uniform log format template 1500 to record therein all the processings that are requested through the various interfaces 210 and 230 provided to the storage system 100 and all the processings that are internally executed in the storage system. The same template 1500 is used to record the operation details within the storage system in the log. Accordingly, references can be made to processings executed in response to the requests made to the storage system 100 and operation records of the storage system.

Further, the changing or deletion of the maintained log is not permitted during the preset term, thereby only permitting log data to be additionally written, which prevents the log data from being tampered. This guarantees that an authorized log is maintained during the operation of the storage system, so an inspection record can be provided upon occurrence of a security-related issue, and information for diagnosing the cause of the failure that has occurred.

(Second Embodiment)

Figure 17:
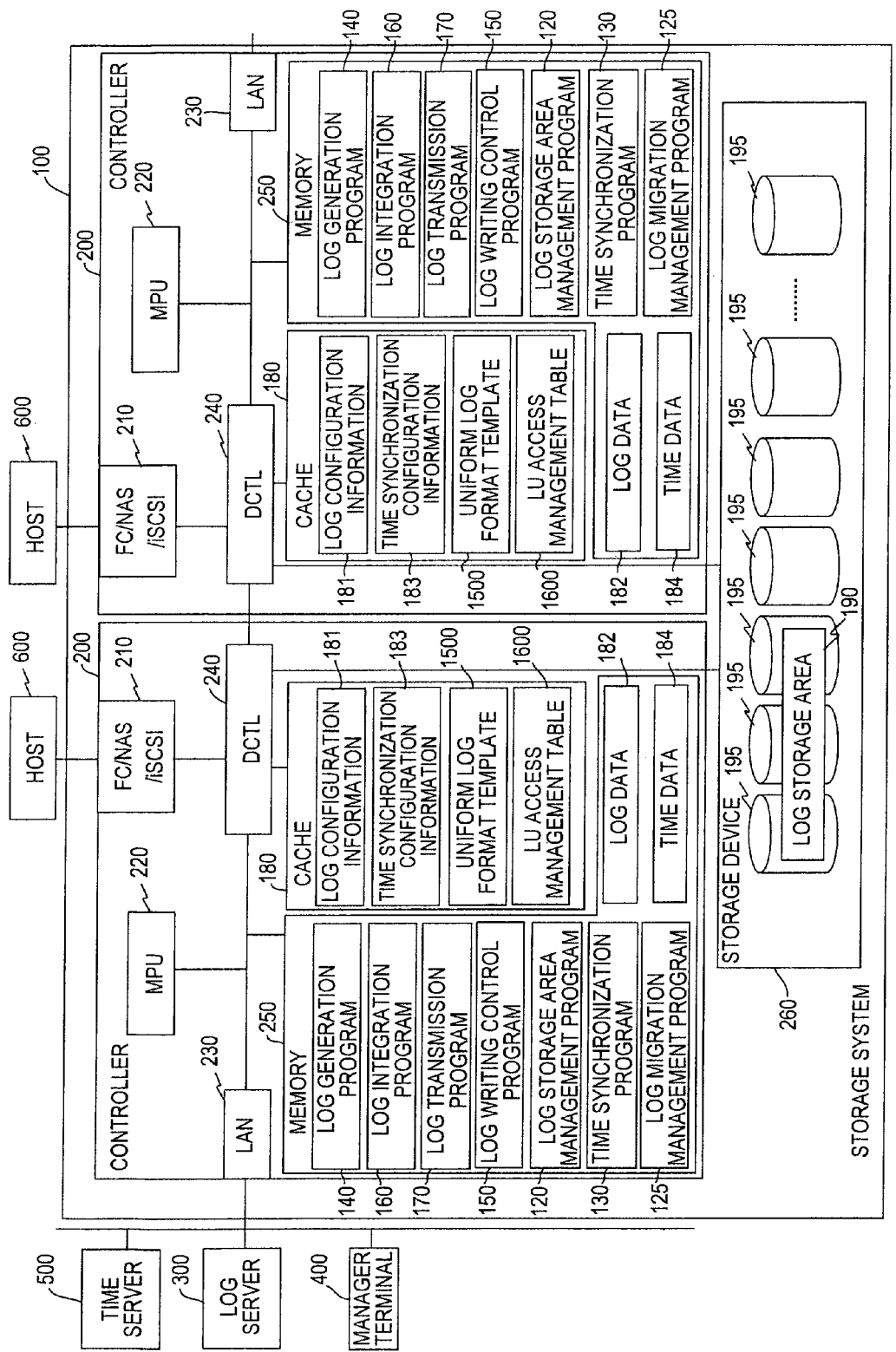
FIG. 17 is a block diagram showing a hardware structure of a storage system according to a second embodiment.

FIG. 17 is a block diagram showing a hardware structure of the storage system 100 according to a second embodiment.

According to the second embodiment, the log data 182 and the time data 184 are stored in the memory 250 instead of the cache 180. The other components are the same as those described above in the first embodiment, and are therefore denoted by the same reference numerals with their description omitted.

In general, the memory 250 provides faster access speed than the cache 180, but only has a smaller capacity. By storing the time data 184 in the memory 250, it is possible to reduce processing time for generating log. In addition, by storing the log data 182 in the memory 250, it is possible to reduce processing time until the log management module 110 writes log data to the disk drive 195 or transmits the log data to the log server 300.

(Third Embodiment)

Figure 18:
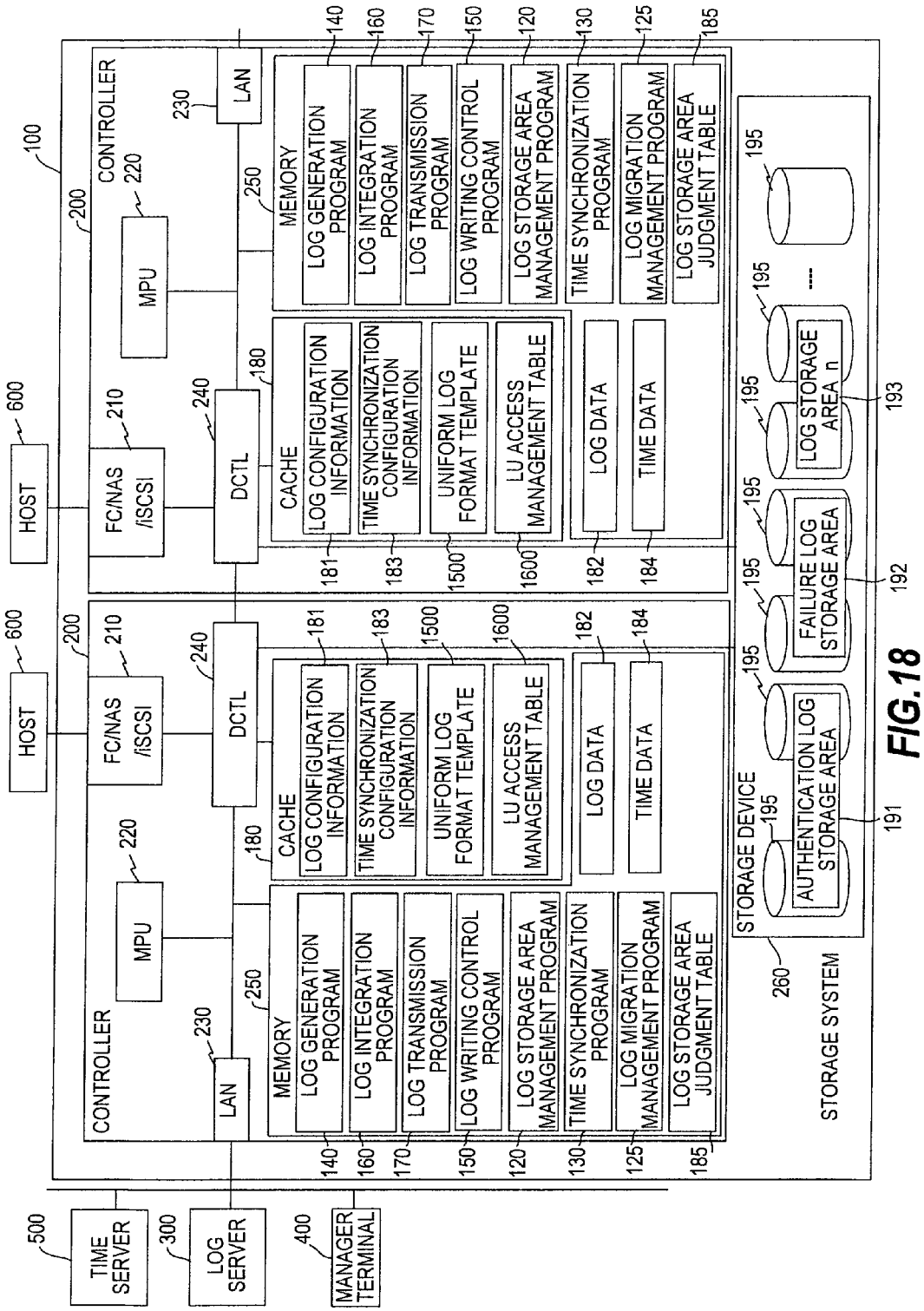
FIG. 18 is a block diagram showing a hardware structure of a storage system according to a third embodiment.

FIG. 18 is a block diagram showing a hardware structure of the storage system 100 according to a third embodiment.

According to the third embodiment, a plurality of log storage areas are created in the disk drive 195, and managed independently of each other. The other components are the same as those described above in the first and second embodiments, and are therefore denoted by the same reference numerals with their description omitted.

According to the third embodiment, there are provided an authentication log storage area 191, a failure log storage area 192, and a log storage area 193 that suits a user's purpose as the need arises. Recorded in the authentication log storage area 191 is the log data relating to authentications among the operation commands transmitted from the manager terminal 400. The log data relating to failures among the operations of storage system 100 are collectively recorded in the failure log storage area 192.

Thus, a log storage area judgment table 185 is provided to judge which operation is stored in which log storage area. Stored in the log storage area judgment table 185 are the processing details and processing results involved in the storage system and the corresponding log storage areas.

Therefore, according to the third embodiment, a plurality of log storage areas are provided to suit various uses, which can store log data different in recorded details and retention terms depending upon the users' purposes.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising:
   a plurality of first interfaces, each of the plurality of first interfaces being coupled to a host computer;
   a plurality of second interfaces, each of the plurality of second interfaces being coupled to a manager terminal;
   a plurality of control units, each of the plurality of control units being coupled to at least one of the first interfaces and at least one of the second interfaces,
   wherein each of the plurality of control units includes a cache memory and a processor operable to cause log data to be generated by each of the plurality of control units, respectively; and
   a plurality of storage units,
   wherein data that is requested to be read by the host computer is stored in the plurality of storage units, and
   wherein the plurality of storage units includes a plurality of log storage areas created in the disk drive and managed independently of each other; and
   a template that specifies a format of log data generated by each of the plurality of control unit;
   wherein each of the plurality of log storage areas storing a different type of the log data, each of the log data being generated by a different process by the plurality of control units,
   wherein each of the plurality of control units further includes a log storage area judgment table that includes a correspondence relationship of a log storage area with processing details and processing result, and
   wherein a determination is made as to which log storage area a log is to be stored based on the correspondence relationship.

2. The storage system according to claim 1, wherein each of the plurality of control units detects an access from the host computer to a coupled first interface of the plurality of first interfaces, detects an access from the manager terminal to a coupled second interface of the plurality of second interfaces, and generates the log data of operations according to the accesses.

3. The storage system according to claim 1, wherein each of the control units obtains the processing details and the processing results executed within the storage system in relation to neither the access to the first interface nor the access to second interface.

4. The storage system according to claim 1,
   wherein a certain control unit of the plurality of control units collects log data generated by each of the other control units from the cache memory of each of the other control units and unifies the collected log data using a template that specifies a format in the cache memory of the certain control unit, and
   wherein the certain control unit writes the log data collected from the other control units and the unified log data generated by the certain control unit into a log storage area configured in the one or more disk drives.

5. The storage system according to claim 2, wherein a first log storage area stores a failure log that is generated based on an access related to failures from the manager terminal.

6. The storage system according to claim 3, wherein a second log area stores an authentication log that is generated from the processing details and the processing results executed in the storage system and that is related to the authentication.

7. The storage system according to claim 1, wherein a plurality of storage units stores a template that specifies a format of log data generated by each of the plurality of control units.

8. The storage system according to claim 1, wherein after detecting the access from the host computer to the first interface and the access from the manager terminal to the second interface, each of the control units obtains processing details and processing results executed in correspondence with the accesses, applies a template to the processing details and the processing results to generate the log data, and stores the log data in the cache memory.

9. The storage system according to claim 1, further comprising:
   a storage unit storing access management information that specifies permission of an access to the log storage area,
   wherein each of the control units denies an access from the host computer to the log storage area by referring to the access management information and denies an access from the management computer to attempt to delete the log storage area by referring to the access management information.

10. A method for managing a log of access in a storage system, the storage system including a plurality of first interfaces, each of the plurality of first interfaces being coupled to a host computer, a plurality of second interfaces, each of the plurality of second interfaces being coupled to a manager terminal, a plurality of control units, each of the plurality of control units being coupled to at least one of the first interfaces and at least one of the second interfaces, each of the plurality of control units including a processor and a cache memory, and a plurality of storage units, the plurality of storage units including a plurality of log storage areas, the method comprising:
   storing, in the plurality of storage units, data that is requested to be read by the host computer;
   wherein the plurality of storage units includes a plurality of log storage areas created in the disk drive and managed independently of each other; and
   a template that specifies a format of log data generated by each of the plurality of control unit;
   wherein each of the plurality of log storage areas storing a different type of the log data, each of the log data being generated by a different process by the plurality of control units,
   wherein each of the plurality of control units further includes a log storage area judgment table that includes a correspondence relationship of a log storage area with processing details and processing result, and
   wherein a determination is made as to which log storage area a log is to be stored based on the correspondence relationship.

11. The method according to claim 10, the method further comprising:
   detecting, by each of the plurality of control units, an access from the host computer to a coupled first interface of the plurality of first interfaces;
   detecting, by each of the plurality of control units, an access from the manager terminal to a coupled second interface of the plurality of second interfaces; and
   generating, by each of the plurality of control units, the log data of operations according to the accesses.

12. The method according to claim 10, further comprising:
obtaining, by each of the control units, the processing details and the processing results executed within the storage system in relation to neither the access to the first interface nor the access to second interface.

13. The method according to claim 10, further comprising:
collecting, by a certain control unit of the plurality of control units, log data generated by each of the other control units from the cache memory of each of the other control units;
unifying, by the certain control unit, the collected log data using a template that specifies a format in the cache memory of the certain control unit; and
writing, by the certain control unit, the log data collected from the other control units and the unified log data generated by the certain control unit into a log storage area configured in the one or more disk drives.

14. The method according to claim 11, further comprising:
storing, by the first log storage area, a failure log that is generated based on an access related to failures from the manager terminal.

15. The method according to claim 12, further comprising:
storing, by a second log area, an authentication log that is generated from the processing details and the processing results executed in the storage system and that is related to the authentication.

16. The method according to claim 10, further comprising:
storing, in a plurality of storage units, a template that specifies a format of log data generated by each of the plurality of control units.

17. The method according to claim 10, further comprising:
after detecting the access from the host computer to the first interface and the access from the manager terminal to the second interface, obtaining, by each of the control units, processing details and processing results executed in correspondence with the accesses, applying, by each of the control units, a template to the processing details and the processing results to generate the log data, and storing, by each of the control units, the log data in the cache memory.

18. The method according to claim 10, further comprising:
storing, in a storage unit, access management information that specifies permission of an access to the log storage area, wherein each of the control units denies an access from the host computer to the log storage area by referring to the access management information and denies an access from the management computer to attempt to delete the log storage area by referring to the access management information.

* * * * *